United States Patent
Fan et al.

(10) Patent No.: US 11,864,698 B2
(45) Date of Patent: Jan. 9, 2024

(54) TOOL FOR TREATING OVERHEAD SURFACES

(71) Applicant: Logistics and Supply Chain MultiTech R&D Centre Limited, Pok Fu Lam (HK)

(72) Inventors: Ka Lun Fan, Pok Fu Lam (HK); Chung Hang Leung, Pok Fu Lam (HK); Chun On Wong, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 0 days.

(21) Appl. No.: 17/685,650

(22) Filed: Mar. 3, 2022

(65) Prior Publication Data

US 2023/0277026 A1  Sep. 7, 2023

(51) Int. Cl.
*A47L 11/38* (2006.01)
*B25J 9/16* (2006.01)
(Continued)

(52) U.S. Cl.
CPC .......... *A47L 11/38* (2013.01); *A47L 11/4002* (2013.01); *A47L 11/4011* (2013.01);
(Continued)

(58) Field of Classification Search
CPC ...... A47L 11/16; A47L 11/162; A47L 11/282; A47L 11/283; A47L 11/38; A47L 11/4008; A47L 11/4038; A47L 11/4069; A46B 13/02; A46B 13/001; A46B 13/008; A46B 5/0058; A46B 5/0054; A46B 5/0091; A46B 5/0083; A46B 5/0087; A46B 5/0079;
(Continued)

(56) References Cited

U.S. PATENT DOCUMENTS

| 689,464 A | * | 12/1901 | Cramer | ................... A46B 13/06 |
| | | | | 15/29 |
| 3,665,542 A | * | 5/1972 | Franzreb | ................... B64F 5/30 |
| | | | | 15/98 |

(Continued)

FOREIGN PATENT DOCUMENTS

CN 112318479 A * 2/2021
DE 102018008198 A1 * 4/2020
(Continued)

OTHER PUBLICATIONS

Translation of WO 9529620 A1 (Year: 1995).*
(Continued)

*Primary Examiner* — Brian D Keller
*Assistant Examiner* — Steven Huang
(74) *Attorney, Agent, or Firm* — Renner, Kenner, Greive, Bobak, Taylor & Weber

(57) ABSTRACT

A tool that is either hand-guided, or machine-guided, for performing surface treatments, such as mopping, of overhead surfaces includes a head for carrying an agitator having a generally planar face that is applied against the overhead surface being treated in uses. A transmission transmits (Continued)

power from a drive motor to the agitator, and an interface on the head is provided for connection to a mounting device by which the head is oriented and guided.

4 Claims, 4 Drawing Sheets

(51) Int. Cl.
*B25J 5/00* (2006.01)
*A47L 11/40* (2006.01)
(52) U.S. Cl.
CPC ....... *A47L 11/4038* (2013.01); *A47L 11/4069* (2013.01); *A47L 11/4075* (2013.01); *B25J 5/007* (2013.01); *B25J 9/1684* (2013.01)
(58) Field of Classification Search
CPC .... A46B 2200/3046; A46B 2200/3073; A46B 17/02; B25J 9/10; B25J 9/1628; B25J 9/1633; B25J 9/1664; B25J 9/1694; B25J 9/1697; B25J 11/005; B25J 11/0065; B25J 11/0008; B25J 11/0085; B25J 13/088; B25J 13/089; B08B 1/04
See application file for complete search history.

(56) References Cited

U.S. PATENT DOCUMENTS

| 3,688,139 | A | * | 8/1972 | Yaguchi | ............... A47L 11/4008 |
| | | | | | 30/388 |
| 4,335,481 | A | * | 6/1982 | Slayman | .............. A47L 11/4075 |
| | | | | | 15/97.1 |
| 2006/0118656 | A1 | * | 6/2006 | Griffith | ................... B08B 3/024 |
| | | | | | 239/280 |

FOREIGN PATENT DOCUMENTS

| FR | 2485912 A2 | * | 1/1982 |
| FR | 2674559 A1 | * | 10/1992 |
| WO | WO-9529620 A1 | * | 11/1995 |

OTHER PUBLICATIONS

Translation of FR 2485912 A2 (Year: 1982).*
Translation of FR 2674559 A1 (Year: 1992).*
Translation of DE 102018008198 A1 (Year: 2020).*
Translation of CN 112318479 A (Year: 2021).*

* cited by examiner

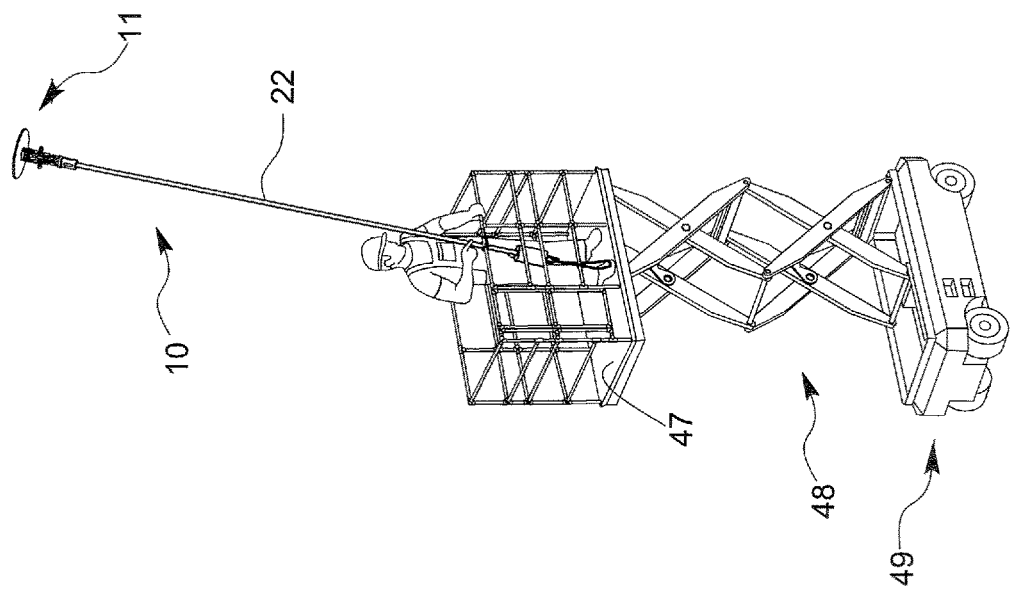
Fig. 3
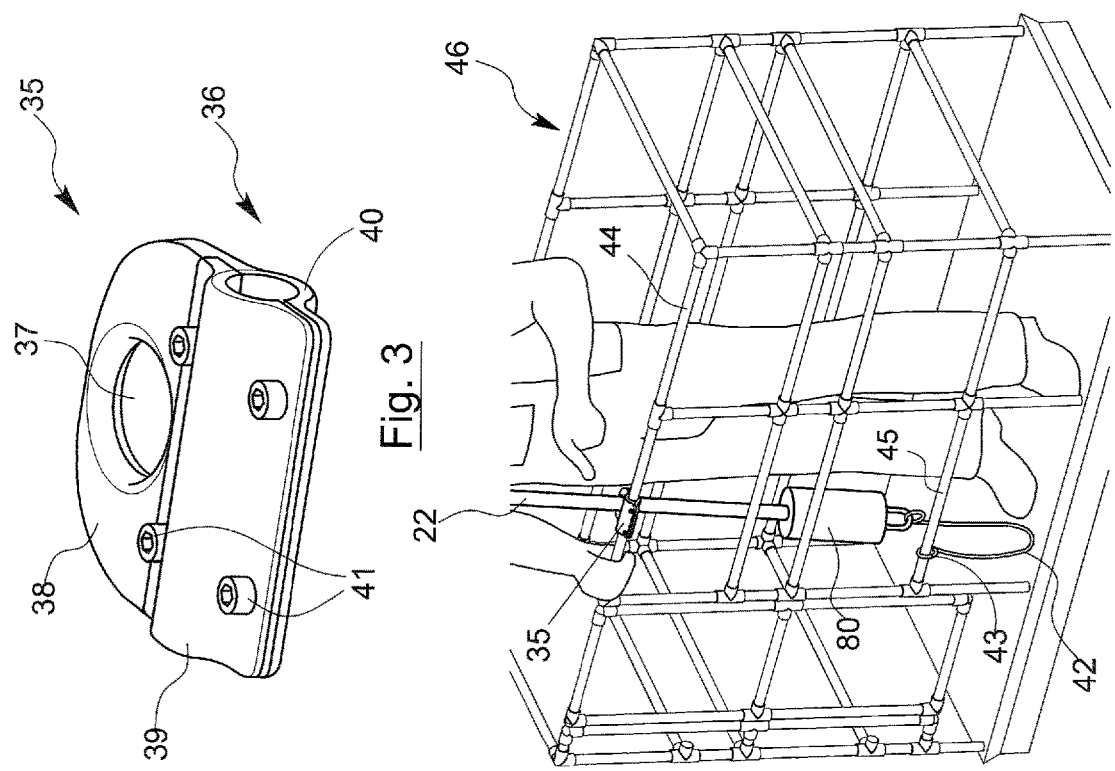
Fig. 4
Fig. 5

TOOL FOR TREATING OVERHEAD SURFACES

TECHNICAL FIELD

The present invention relates to a tool that is either hand-guided, or machine-guided, for performing surface treatments, such as mopping, of overhead surfaces.

BACKGROUND OF THE INVENTION

High ceilings can be a challenge to keep clean, even with mobile lifts or scaffolds that allow access to safely reach them. In airports, for instance, there are vast ceilings that must be cleaned during brief quiet periods and with minimal disruption. With a mobile lift or scaffold beneath a section of ceiling to be cleaned, long-reach mops allow workers to clean overhead beyond the area immediately above the working platform, but extending these tools horizontally in this way and manipulating them manually is physically demanding. Another issue with such prior art tools is the ability of users to assess the state of the surface being treated, particularly toward the extents of their reach, which can adversely affect cleaning quality.

It is an object of the present invention to overcome or substantially ameliorate the above disadvantages or, more generally, to provide an improved tool for treating overhead surfaces.

DISCLOSURE OF THE INVENTION

According to one aspect of the present invention there is provided a tool for treating overhead surfaces comprising:
   a drive motor;
   a head for carrying at least one agitator having a generally planar face that is applied against an overhead surface being treated in use;
   a transmission for transmitting power from the drive motor to the agitator, and
   an interface on the head for connection to a mounting device by which the head is oriented and guided.

Preferably the at least one agitator is a rotary element rotated about an agitator axis. Multiple agitators may be mounted to rotate about respective axes that are substantially parallel. Alternatively, the at least one agitator may orbit and/or rotate and/or reciprocate for moving in an output plane parallel to the planar face, or else the at least one agitator may comprise an endless belt, where a run of the belt between two rollers defines the planar.

Preferably the at least one agitator comprises a cleaning pad. Alternatively, the at least one agitator may be configured for polishing, sanding, abrading, grinding or like surface treatments the use rubbing action in a plane.

Preferably the tool further comprises a camera coupled to the tool head for capturing images of the surface and generating image data, and a communications device that receives and transmits the image data.

Preferably the mounting device comprises an elongate member, and the interface comprises a hinge generally transverse to the elongate member, outer end of the elongate member is connected by the hinge to the tool head. This hinge is preferably sufficiently resistant to turning that its set angular position can be adjusted manually prior to use, and tends to stay in this set angular position during use, thereby providing accommodation for readily inclining the planar face according to the orientation of the surface to be cleaned. This hinge allows the user to readily orient the planar face and manually guide the tool head to move parallel to the surface to be cleaned. Alternatively, resilient means, such as a spring, may urge the head to rotate toward the set angular position. Detents may provide for stepwise angular adjustment.

Alternatively, a plurality of transverse pivots may provide a multi-axis swivel joint.

Preferably the drive motor is fixed at the outer end of the elongate member and the transmission comprises a flexible shaft that extends axially from the drive motor through the hinge to the agitator for transmitting torque from the motor to the agitator while accommodating relative inclination of the agitator axis. Preferably the tool head comprises a pair of parallel arms disposed either side of the flexible shaft, each arm fixed at a proximal end to a bearing block supporting the agitator for rotation, and wherein in a distal end coaxial bolts through the arms define the hinge. Alternatively, the transmission of torque to the agitator through different angles of inclination of the agitator axis may be achieved with shafts connected by a universal joint, or an equivalent.

Preferably the inner end of the elongate member is connected to a counterweight. The counterweight may comprise batteries for powering the drive motor, or else the motor may comprise part of the counterweight, as with a tubular elongate member through which the transmission extends.

Preferably the tool further comprises a pivot fixture for supporting the tool in use, the pivot fixture comprising a mount for fastening the pivot fixture to a scaffold, and opening for slidingly receiving the elongate member, while allowing the elongate member to rotate about a transverse axis through at least 50 degrees.

Preferably the tool further comprises a tether fixed at outer end to the elongate member or the counterweight, and the opposite end having a fastener for connection to the scaffold.

Optionally, the tool may comprise a coupling for connecting a fluid line, the coupling being arranged near the inner end of the elongate member, the coupling connected to a fluid line leading to the tool head and terminating in a nozzle for applying fluid to the agitator or surface.

Optionally a fluid container is arranged on the handle end or a fluid container is provided which is adapted to be carried by an operator and is fluidically connectable to the coupling. The fluid line may be connected to the fluid container and a pump, such as a hand pump, may be arranged on the fluid container for directing the fluid to the nozzle.

Optionally the communications device transmits the image data wirelessly to a hand-held device having a display. The tool may further comprise a device holder mounted to the elongate member for holding the hand-held device.

In a further embodiment of the invention, the mounting device comprises an articulated robot arm, and the interface comprises a demountable coupling that rigidly couples outer end of the articulated robot arm to the tool head, the tool head further comprises an array of proximity sensors, the robot arm comprises a controller that receives an output signal from the proximity sensors to orient the planar face and guide the tool head to move parallel to the surface to be cleaned.

The demountable coupling may comprise a locking actuator, the operation of which is controlled by the controller, allowing the articulated robot arm to attach and remove different tool heads.

Preferably the proximity sensors are each disposed in a plane orthogonal to the agitator axis and parallel to the generally planar face.

Preferably the articulated robot arm comprises at least three arm portions and at least three rotational joints configured to rotate the at least three arm portions, respectively; and the controller is configured to control rotation of the at least three rotational joints to move a distal end of an endmost arm portion of the at least three arm portions generally rectilinearly and parallel to the surface to be cleaned.

Preferably the tool further comprises a motor vehicle, a lift mounted to the motor vehicle that carries the articulated robot arm for raising and lowering the articulated robot arm. Preferably control of the motor vehicle, lift and articulated robot arm are coordinated. To reduce the burden on a remote operator tasked with operating the tool, a positioning aid may include a position feedback system that cooperates with a 3-dimensional model of the ceiling and all adjacent structure. In this manner, for instance, a motor vehicle position and orientation, and lift extension to be coordinated with a safe starting position and a starting orientation of the tool head, before it is raised to a position in which the planar face abuts a flat surface to be cleaned, while avoiding obstacles and reducing the need for environmental sensors.

This invention provides a treating overhead surfaces which is effective and efficient in operational use, which reduces maintenance costs, and has an overall simple design which minimizes manufacturing costs. By providing a hand-guided treatment tool with ergonomic advantages, the physical demand on workers is reduced. Furthermore, a problem blocking the commercialization of machine-guided treatment tools is overcome by providing a solution that ensures appropriate agitator alignment for high coverage rates that mitigates the risks of damage to the surface.

BRIEF DESCRIPTION OF THE DRAWINGS

Preferred forms of the present invention will now be described by way of example with reference to the accompanying drawings, wherein:

FIG. 3 is a pictorial view of a joint fixture for supporting the tool of FIG. 1;

FIG. 4 is an enlarged pictorial view of a handle end of the tool of FIG. 1 in use;

FIG. 5 is a pictorial view of the tool of FIG. 1 in use on a mobile lift;

DESCRIPTION OF THE PREFERRED EMBODIMENTS

Figure 1:
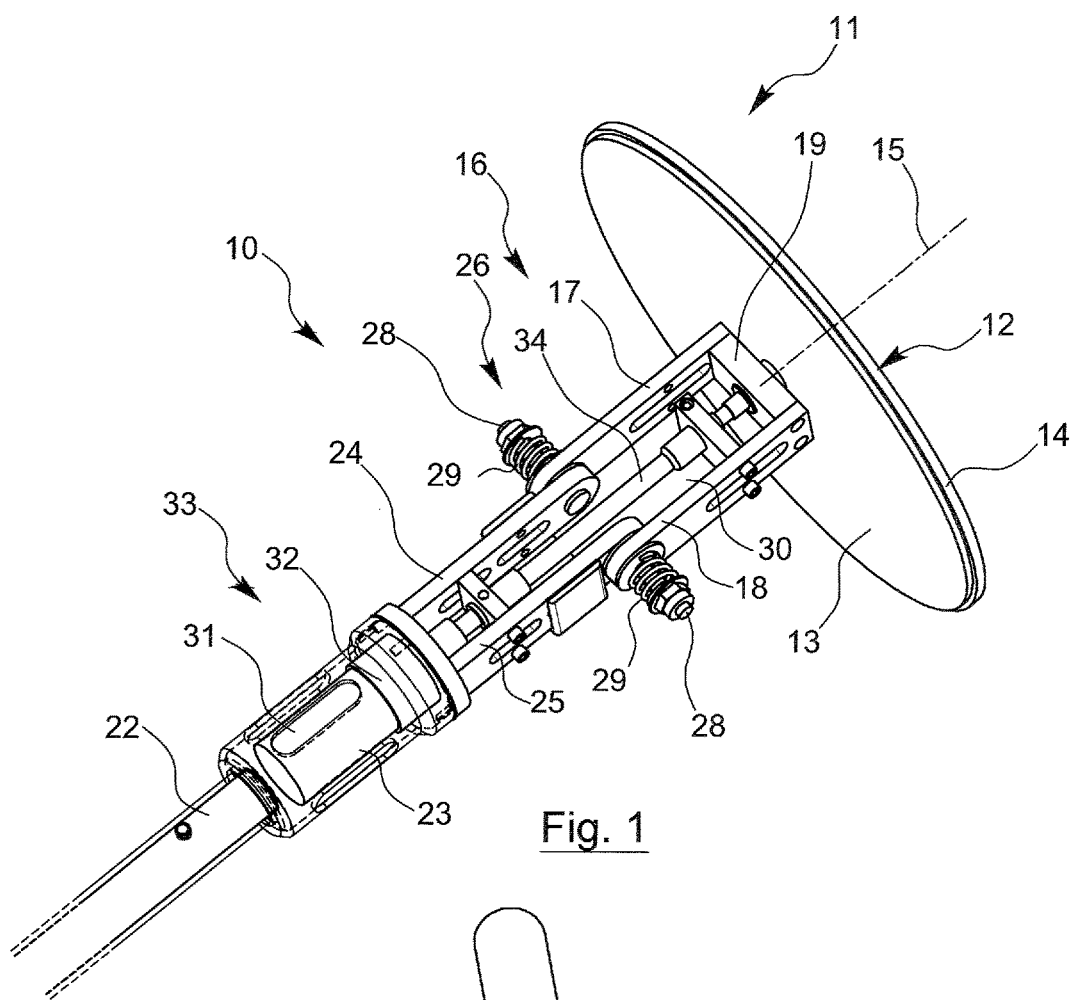
FIG. 1 is a pictorial view, from the side, of the head of a tool according to a first embodiment of the invention.
Figure 2:
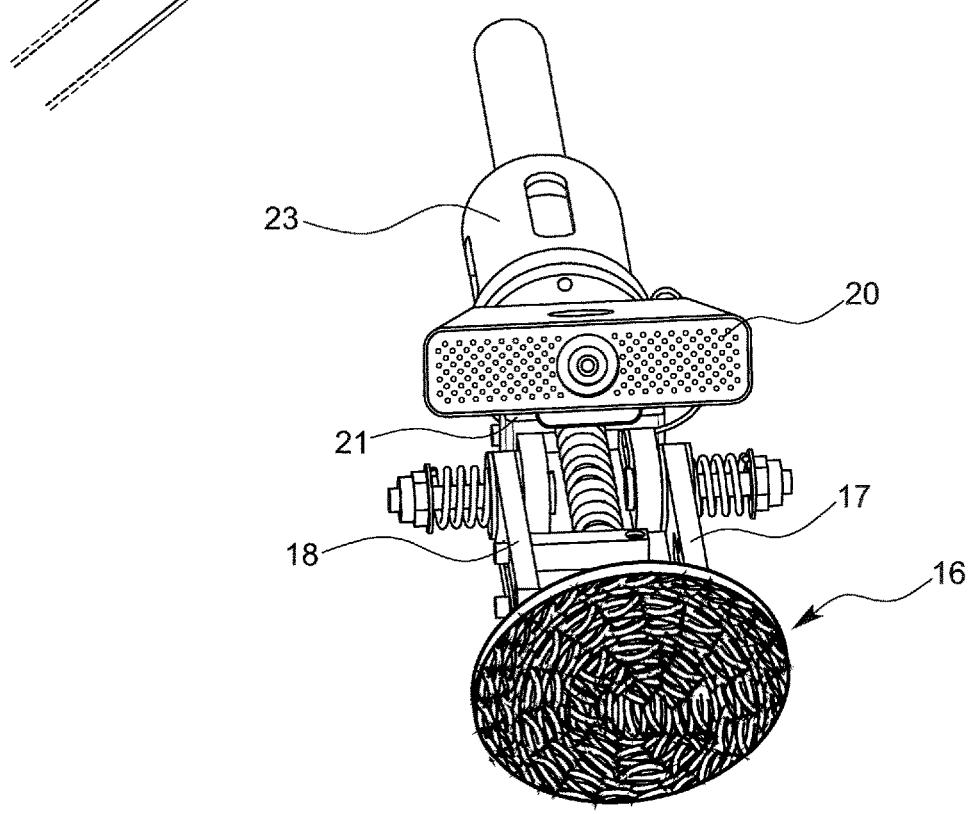
FIG. 2 is a pictorial view of a variant of the head of FIG. 1 that includes a camera.

Referring to FIGS. 1 and 2, a mop or surface treatment tool 10 of a first embodiment of the invention may comprise an agitator 11 having a generally planar face 12 of circular form that is applied, in use, against an overhead surface being cleaned. The agitator 11 may comprise a rotary disc 13 carrying a cleaning pad 14 that defines the planar face 12 on its outer side. From its inner side, at the centre of the disc 13, an agitator shaft (not shown) may project axially in the direction of agitator axis 15 about which the agitator 11 rotates. The cleaning pad 14 may be demountable, allowing for it to be readily replaced.

Carrying the agitator 11 is a head 16, which may comprise a pair of parallel arms 17, 18 that are elongated axially, each arm 17, 18 fixed at a proximal end to a bearing block 19. A bearing (not shown) mounted in the bearing block 19 may receive the agitator shaft to support the agitator 11 for rotation about the agitator axis 15.

A camera 20 may be coupled to the tool head 16 for capturing images of the surface and generating image data. A communications device or wireless transmitter 21 may receive and transmits the image data.

The head 16 may mounted on the outer end of an elongate member 22 or mounting device. The inner end of the elongate member 22 is held by the user to manually guide the movement of the head 16. Structure fixed to the outer end of an elongate member 22 for making the connection to the head 16, may comprise a hollow casing 23 and a pair of parallel axially-extending legs 24, 25 that at their outer ends are received between the arms 17, 18 to define an axially-extending shaft-receiving space 30 therebetween.

An interface on the tool head for connection to the mounting device or elongate member 22 may comprise a hinge 26 generally transverse to the elongate member 22. The hinge 26 may comprise coaxial bolts 27, 28 connecting the legs 24, 25 to the arms 17, 18 to provide for relative inclination of the agitator axis 15 to the elongate member 22. Each bolt 27, 28 may also receive a stack of resilient washers 29, such as Belleville washers, allowing for the clamping load between the arms 17, 18 and legs 24, 25 to be set to provide a desired level of friction and resistance to turning of the hinge 26. In this manner, a suitable resistance level may allow the inclination of the head 16 to be maintained during a cleaning operation, while still permitting its angular position to be readily set manually prior to use. In this way, the hinge 26 allows the user to readily orient the planar face 12 as required to suit the surface to be cleaned and to manually guide the tool head to move parallel to such surfaces.

For rotating the agitator 11 a rotary electric gearmotor 33 may include a motor 31 and integrated gear reduction 32 and may be mounted to the elongate member 22 and within hollow casing 23 with its output shaft aligned axially. Power may be provided to the motor via a cable passing along an axial space through the middle of the elongate member 22. A flexible shaft 34 is connected at opposite ends to the gearmotor 31 and the agitator 11 and passes generally axially through the shaft-receiving space 30. The flexible shaft 34 is thus able to transmit torque over the range of inclinations of the agitator axis 15.

Referring to FIGS. 3 to 5, a counterweight may be connected to the inner end of the elongate member 22 inboard of a length of the elongate member 22 that is gripped manually in use. The inner end of the elongate member 22 may also carry a switch for control of the motor.

A pivot fixture 35 for supporting the tool in use is best seen in FIG. 5, and may comprise a mount 36 for fastening the pivot fixture to a scaffold, and an opening 37 for slidingly receiving the elongate member 22. The mount 36 may comprise a block 38 in which the opening 37 is formed and with an integrated saddle portion 39. A separate clamping saddle 40 may be connected by screw fasteners 41 to the block 38. Concave sides of the clamping saddle 40 and saddle portion 39 may thus be clamped against complementary surfaces of a scaffold member 44 to secure the pivot fixture 35 in place, as with the block 38 approximately horizontal.

A tether 42 may be fixed at one end to an inner end of the tool 10. An opposite end of the tether 42 has a fastener 43 that, in use, is connected to a member 45 of the scaffold 46. With the elongate member 22 secured by both the pivot fixture 25 and tether 42 to the scaffold 46, it is completely retained and cannot be dropped, while still allowing the elongate member 22 to be raised and lowered and rotated about a transverse axis through at least 50 degrees, as by 25 degrees either side of an upright position.

Advantageously, the scaffold 46 may surround the platform 47 of a lift 48 mounted to a motor vehicle 49, as shown in FIG. 5. The pivot fixture 35 thus provides a fulcrum that, together with the counterweight, assists in manipulation of the tool in a more ergonomically satisfactory way that is compatible with improved productivity. A device (not shown) for receiving and displaying the image data from the camera 120 may be mounted to the scaffold or the tool, allowing users to better assess the state of the surface being cleaned.

Figure 6:
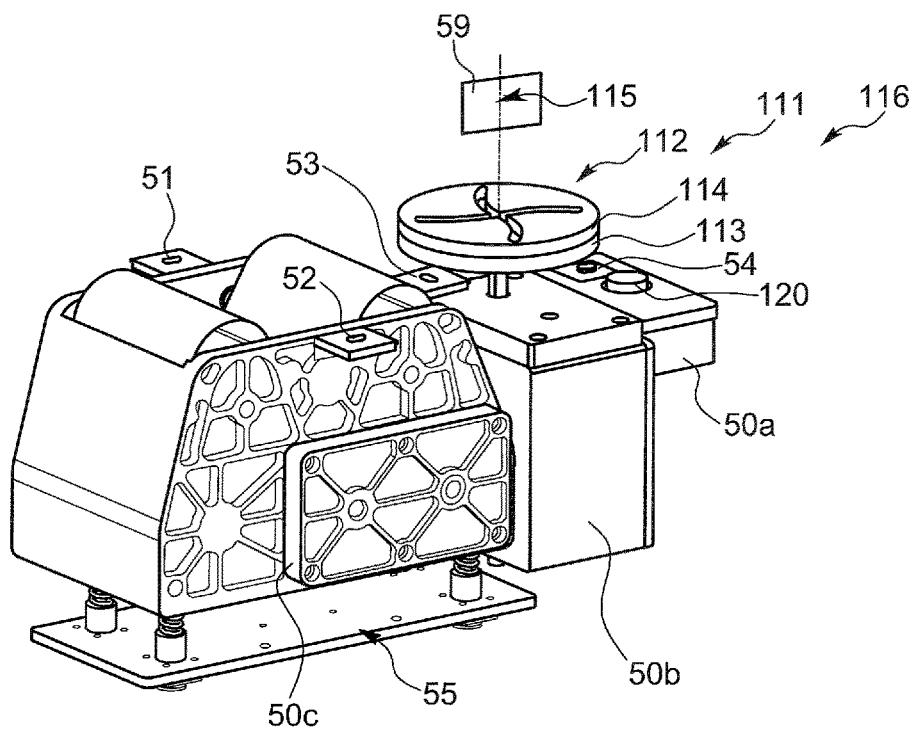
FIG. 6 is a pictorial view, from above, of the head of a tool according to a second embodiment of the invention.

Referring to FIG. 6, a mop or surface treatment tool 110 of a second embodiment of the invention may comprise a head 116 carrying an agitator 111. The agitator 111 may be of like form to the agitator 11, having a rotary disc 113 carrying a cleaning pad 114 that defines a circular, planar face 112 on its outer side and which rotates about agitator axis 115.

The head 116 may comprise an assembly of mutually coupled frame parts 50a, 50b, 50c. The part 50b may hold the gearmotor (not shown) that directly drives the agitator 111, and which is coupled between the frame parts 50a and 50c. Facing in the same direction as the planar face 112, the head 116 includes an array of proximity sensors 51-54. The sensors 51-53 may be disposed in a plane (not shown) orthogonal to the agitator axis 115 and parallel to, and offset inwardly from, the generally planar face 112. Considering an imaginary plane 59 that equally bisects the head 116, the agitator axis 115 may lie in the plane 59 and two of the sensors 51, 52 may be disposed at the periphery of the head 116 generally equidistant from the plane 59. The sensors 51-53 may be mounted to the frame part 50c, while the sensor 54 may be held in part 50a, which also holds the camera 120 and associated wireless transmitter (not shown). The proximity sensors 51-54 each have like fields of view that are aligned in the direction of axis 115 and are non-occluded.

An interface 55 is provided on the head 116 for demountable connection to a mounting device by which the head 116 is oriented and guided. The interface 55 may comprise an adapter plate or like coupling structure by which a rigid connection is made, and comprising openings for receiving mechanical fasteners.

Figure 7:
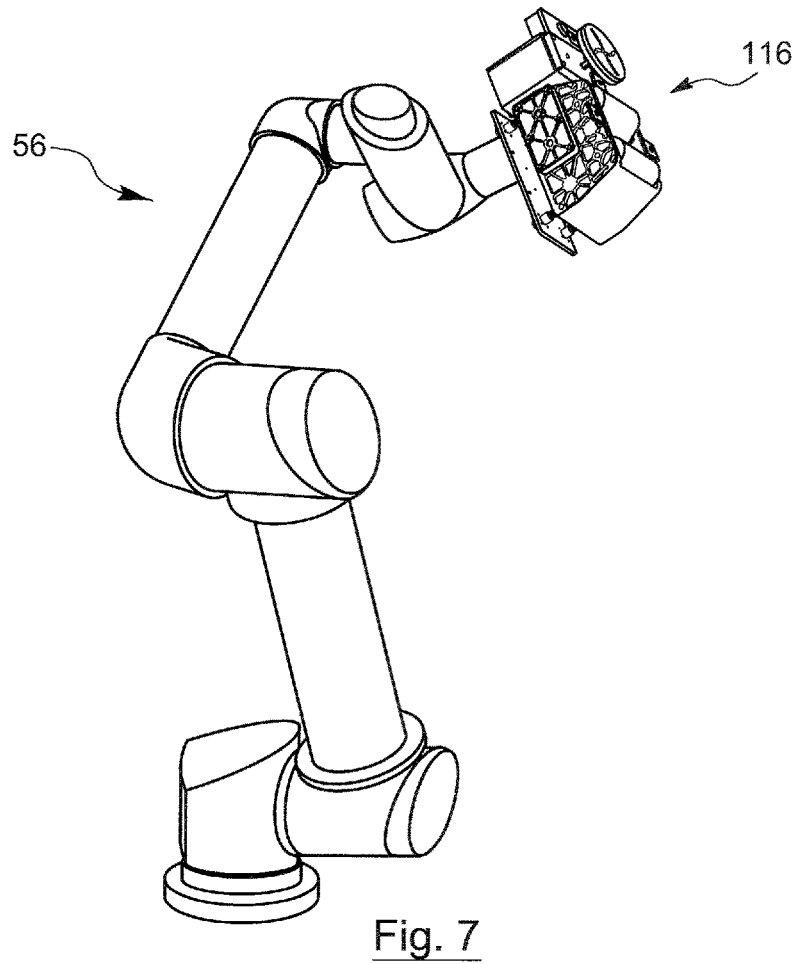
FIG. 7 is a pictorial view, from the side, of a tool carrying the head of FIG. 6.
Figure 8:
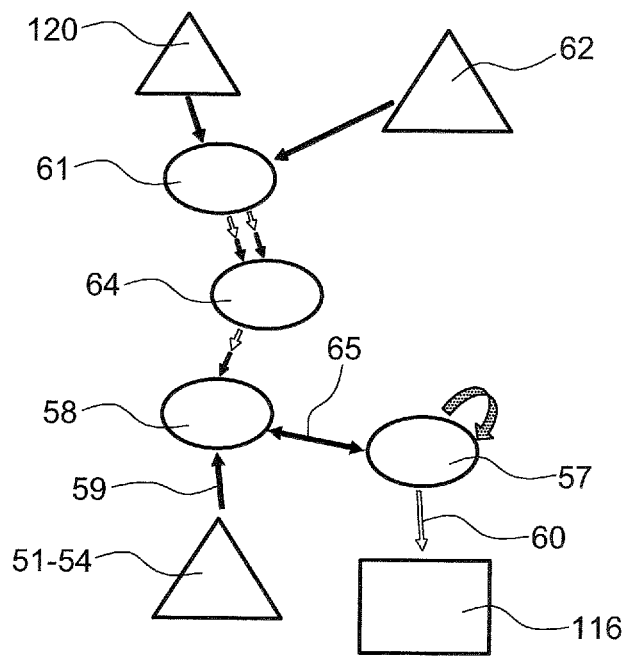
FIG. 8 is a schematic of the control system of the tool of FIG. 7.
Figure 9:
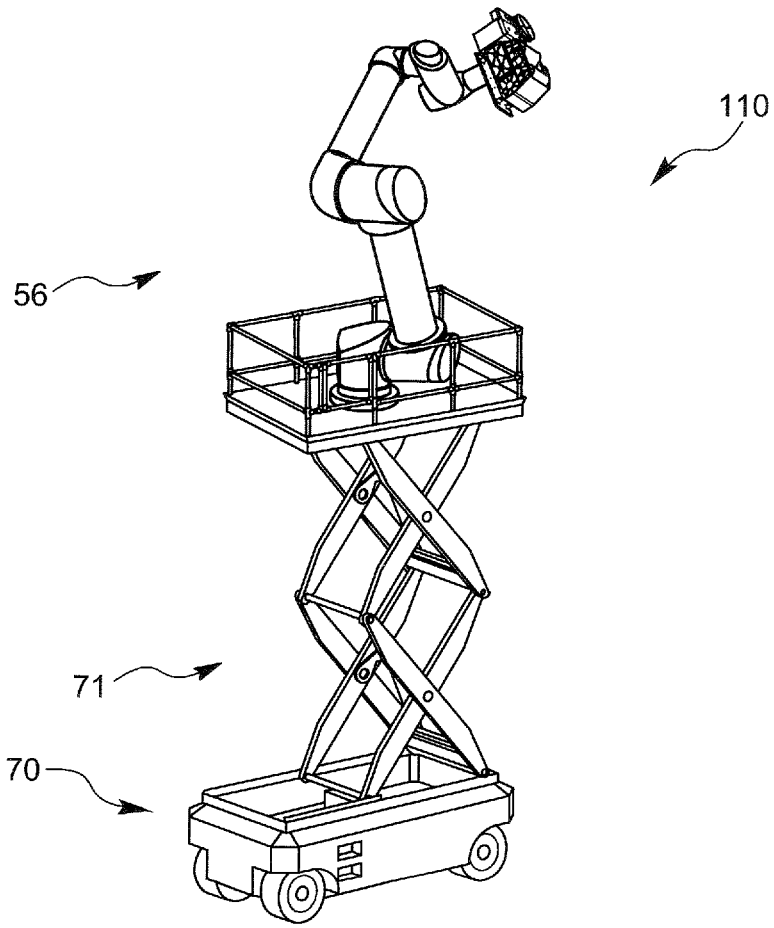
FIG. 9 is a schematic of the tool of the second embodiment of the invention.

As shown in FIG. 7, the head 116 is carried on an outer end of an articulated robot arm 56, by which it is oriented and guided to perform an overhead cleaning operation. A control network includes a sensor controller 58, shown in FIG. 8, receives an output signal from the proximity sensors 51-54 and communicates as on a bus 65 with a robot arm controller 57 that controls movement of the robot arm 56. The robot arm controller 57 may also issue a control signal 60 to the head 116, as to control starting and stopping rotation of the agitator 111. An input computer 61 may receive the image data wirelessly from the camera and display it to the operator. An input device 62, such as a keyboard or joystick, is monitored by the input computer 61 and used to provide operating commands that are relayed on to the robot arm controller 57 via a commutations module 64 and the sensor controller 58.

The articulated robot arm 56 may comprise six arm portions and six rotational joints configured to rotate the six arm portions, respectively. The robot arm controller 58 is configured to control rotation of the rotational joints to move a distal end of an endmost arm portion to orient the planar face and guide the tool head generally rectilinearly to move parallel to the surface to be cleaned.

The surface treatment tool 110 may further comprise a motor vehicle 70, a lift 71 mounted to the motor vehicle 70 that carries the articulated robot arm 56 for raising and lowering the articulated robot arm. Preferably control of the motor vehicle, lift and articulated robot arm are coordinated. To reduce the burden on a remote operator tasked with operating the tool, a positioning aid may include a position feedback system that cooperates with a 3-dimensional model of the ceiling and all adjacent structure. In this manner, position and orientation of the motor vehicle 70 and extension of the lift 7 may be coordinated with a safe starting position and a starting orientation of the tool head 116. By ensuring appropriate agitator alignment, high coverage rates can be obtained, while even contact pressure mitigates the risks of damage to the surface being cleaned.

Aspects of the present invention have been described by way of example only and it should be appreciated that modifications and additions may be made thereto without departing from the scope thereof.

The invention claimed is:

1. A tool for treating overhead surfaces comprising:
    an elongate member, wherein an inner end of the elongate member is disposed longitudinally opposite an outer end of the elongate member;
    a drive motor positioned at the outer end of the elongate member;
    a counterweight positioned at the inner end of the elongate member;
    a head comprising a bearing block and a pair of arms parallel to one another, proximal ends of the pair of arms fixed to the bearing block,
        the bearing block carrying a rotary agitator mounted to rotate about an agitator axis parallel to the pair of arms,
        the rotary agitator having a generally planar face that is configured to be applied against an overhead surface being treated in use;
    a hinge that connects the outer end of the elongate member to the head and comprises first and second coaxial bolts transverse to the elongate member and fixed in distal ends of the pair of arms;
    a shaft-receiving space that extends axially between the pair or arms and the coaxial bolts;
    a flexible shaft that extends axially from the drive motor through the shaft-receiving space to the rotary agitator for transmitting torque from the drive motor to the rotary agitator while accommodating a relative inclination of the agitator axis caused by a pivot motion of the hinge;
    a camera coupled to the head for capturing images of the overhead surfaces and generating image data, and
    a communications device that receives and transmits the image data.

2. The tool of claim 1 wherein the rotary agitator comprises a cleaning pad.

3. The tool of claim 1 further comprising a pivot fixture for supporting the tool in use, the pivot fixture comprising a mount for fastening the pivot fixture to a scaffold, and an opening for slidingly receiving the elongate member, while allowing the elongate member to rotate about a transverse axis through at least 50 degrees.

4. The tool of claim 1 further comprising a tether fixed at the outer end to the elongate member or the counterweight, and the opposite end having a fastener for connection to a scaffold.

\* \* \* \* \*